United States Patent [19]
Leger et al.

[11] Patent Number: 5,771,356
[45] Date of Patent: Jun. 23, 1998

[54] APPARATUS FOR CONTROLLING FIFO BUFFER DATA TRANSFER BY MONITORING BUS STATUS AND FIFO BUFFER THRESHOLDS

[75] Inventors: Geary Leger; Sriraman Chari, both of Fremont, Calif.

[73] Assignee: Cirrus Logic, Inc., Fremont, Calif.

[21] Appl. No.: 368,562

[22] Filed: Jan. 4, 1995

[51] Int. Cl.[6] .......................... G06F 13/00; G06F 13/14
[52] U.S. Cl. ........................... 395/200.63; 395/200.61; 395/200.62; 395/200.64; 395/200.65; 395/872; 395/876; 395/877; 395/880
[58] Field of Search ..................... 395/200, 250, 395/425, 872–877, 281, 287–289, 292, 295–297, 200.6–200.65, 880–881; 364/DIG. 1; 370/84, 60, 61, 85.1, 359

[56] References Cited

U.S. PATENT DOCUMENTS

| | | | |
|---|---|---|---|
| 5,181,201 | 1/1993 | Schauss et al. | 370/359 |
| 5,237,660 | 8/1993 | Weber et al. | 395/877 |
| 5,278,956 | 1/1994 | Thomsen et al. | 364/238.6 |
| 5,295,246 | 3/1994 | Bischoff et al. | 395/854 |
| 5,299,315 | 3/1994 | Chin et al. | 395/290 |
| 5,379,399 | 1/1995 | Conway-Jones et al. | 711/109 |
| 5,440,691 | 8/1995 | Carrafiello et al. | 395/200.64 |
| 5,506,967 | 4/1996 | Barajas et al. | 364/DIG. 1 |
| 5,546,543 | 8/1996 | Yang et al. | 395/200.65 |
| 5,566,175 | 10/1996 | Davis | 395/200.64 |

*Primary Examiner*—Parshotam S. Lall
*Assistant Examiner*—Bharat Barot
*Attorney, Agent, or Firm*—Frank D. Nguyen

[57] ABSTRACT

This invention provides efficient and flexible data transfer management for a First-In First-Out (FIFO) buffer connects to a system bus and implements multiple data thresholds (e.g., two). Data transfer by the FIFO is controlled by either casually or more aggressively acquiring the system bus based on the amount of data inside the FIFO and on the state of the system bus. By balancing the bus activity level against the FIFO data level, bus access is facilitated at times when the bus has lower activity. This makes the FIFO less obtrusive when moving data across the bus. As a result, the bus is used more efficiently. The system bus is casually acquired when the FIFO data level reaches a soft threshold and the system bus is idle. Casual control of the system bus is relinquished when request from another device sharing the bus is received and a predetermined amount of data has been transferred. On the other hand, the system bus is more aggressively acquired when the FIFO data level reaches a hard threshold. Aggressive control of the system bus is relinquished only when data transfer is complete or when there is an emergency condition such as bus error. The thresholds can be dynamically adjusted based on the bus activity level. In another embodiment of the present invention, the amount of data transfer varies depending on whether the soft or hard threshold is crossed.

37 Claims, 8 Drawing Sheets

APPARATUS FOR CONTROLLING FIFO BUFFER DATA TRANSFER BY MONITORING BUS STATUS AND FIFO BUFFER THRESHOLDS

TECHNICAL FIELD

This invention relates generally to peripheral hardware controllers in computer systems, and more particularly to any controller that uses a FIFO to control input/output (I/O) data transfer across a CPU bus to and from peripheral devices.

BACKGROUND ART

In computing equipment, first-in-first-out (FIFO) storage systems serve as a buffer between two devices, allowing the devices to function independently. A FIFO buffer stores output transmitted from one device until the receiving device is ready for it thereby providing time independence between the two devices. In addition to accommodating transmitting and receiving devices with different speeds, FIFO buffers are also used to accommodate bus traffic caused when too many data devices share the same system bus. For example, when the system bus is busy with an on-going activity, a FIFO buffer can be used to hold a transmitting device's data until the system bus becomes available again. FIFO buffers are well suited for these tasks because their functional character is especially compatible with the sequential nature of data streams transmitted and received by computer systems. In other words, the first-in-first-out nature of FIFO buffers allow the receiving devices to receive the data elements in the same order as they were when transmitted.

Figure 1:
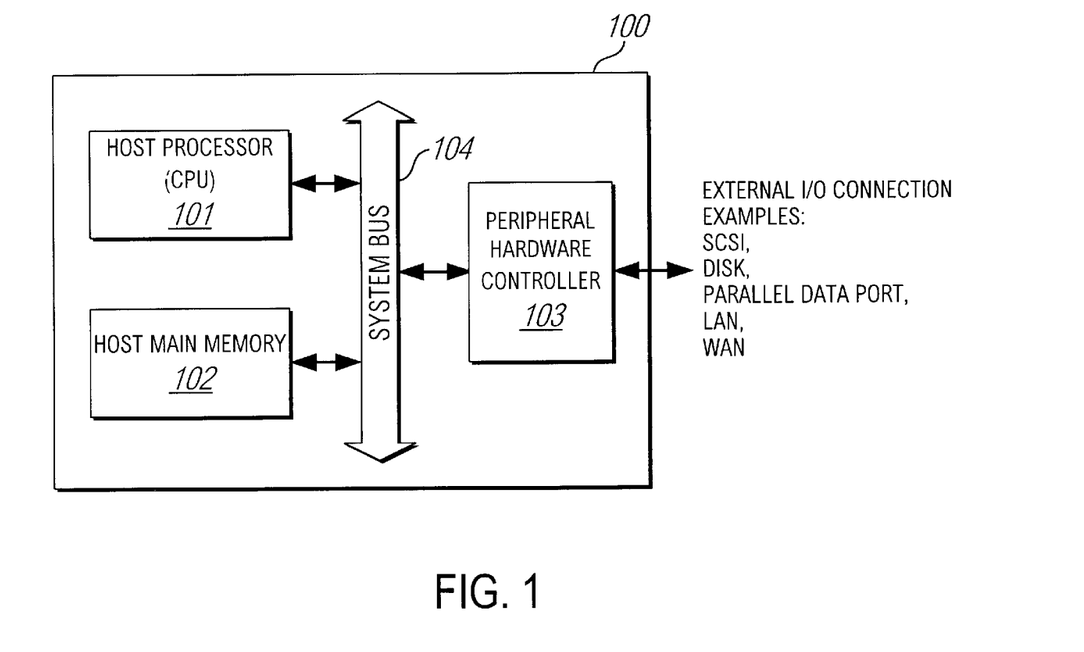
FIG. 1 depicts a typical computer system that utilizes FIFOs for controlling data transfer between the CPU bus and external I/O connections.

Reference is now made to FIG. 1 which illustrates an overview of a typical computer system that utilizes FIFOs in controlling data transfer between the CPU bus and external I/O connections. In FIG. 1, computer system 100 comprises host CPU 101, host memory 102, and peripheral hardware controller 103. Peripheral hardware controller 103 is coupled to host CPU 101 and host memory 102 through system bus 104. Peripheral hardware controller 103 provides the interface between system bus 104 and external I/O devices. More specifically, peripheral hardware controller 103 controls the data transfer between system bus 104 and external Input/Output (I/O) interfaces such as disk drive interface, parallel data port interface, small computer system interface (SCSI), local area network (LAN) interface, and wide area network (WAN) interface. For the reasons discussed earlier, FIFO buffers are used for data transfer tasks inside peripheral hardware controllers such as controller 103.

In controlling data transfer, prior art FIFO control mechanisms make a decision to transfer data across the bus to and from host memory by monitoring the state of the FIFO buffer. More particularly, prior art FIFO control incorporates a single FIFO threshold and decides to transfer data across the bus when the amount of data in the FIFO crosses the threshold value. The problem with this prior art approach is that when there are multiple devices sharing the bus, there is no load balancing on the system bus. The reason is that when multiple devices share a bus, each device empties or fills its FIFO until a threshold is reached and then transfers the FIFO data across the bus. This arbitrary approach may result in periods when multiple devices contend for the bus simultaneously, leading to data loss. Conversely, the prior art approach may also lead to undesirable long periods when the bus stays idle (i.e., not being used). Thus, the prior art approach does not utilize the bus efficiently. Moreover, the prior art approach further fails to provide for a way to dynamically cope with the fluctuation of the amount of bus activities over time which further contributes to the inefficient utilization of the bus.

On the other hand, while some modern system buses, such as the peripheral component interface (PCI) bus, have the capability to detect a wide range of bus activities such as whether the system bus is busy (not available) and whether another device sharing the same system bus is requesting use of the bus when one device is actively transferring data across the bus, other system buses have no capability to detect whether the bus is available and whether another device is requesting for the bus. When the system bus does not possess the capability of a PCI bus, balancing the bus load by monitoring its activities presents a challenge. Nevertheless, more efficient bus utilization still needs to be achieved. Because prior art FIFO control utilizes but a single threshold in controlling data transfer, the monitoring process is often inadequate to determine the urgency in acquiring the system bus to prevent FIFO underrun or overrun. Thus, one advantage of the invention is in providing better bus load balance and hence more efficient bus utilization. Another advantage is in providing more efficient bus utilization when bus activities and/or bus state can not be monitored.

SUMMARY OF THE INVENTION

The above and other advantages are satisfied by the present invention which balances the bus activities and the FIFO buffer data level. In one embodiment, the present invention comprises means for monitoring the state of the system bus, means for monitoring the state of the FIFO buffer, and means for casually or more aggressively acquiring the control of the system bus, selectively, based on status of the system bus and status of the FIFO buffer. The system bus monitoring means determines whether the bus is busy or whether there is a request by another device sharing the bus for its service.

The FIFO monitoring means determines whether data level crosses a soft threshold or a hard threshold of the FIFO buffer. The bus is casually acquired by the acquiring means if the system bus is idle and if the data level crosses the soft threshold of the FIFO buffer. Casual control is relinquished if there is a request for the use of the bus by another device and if a predetermined amount of data has been transferred. The bus is more aggressively acquired if the data level crosses the hard threshold of the FIFO buffer. More aggressive control is relinquished when the intended data transfer is complete or if the bus suddenly become unavailable due to an emergency such as bus error.

The present invention also takes into consideration the dynamic nature of bus activities to automatically adjust the thresholds to improve the efficiency of the system bus. To control the dynamic adjustment of the thresholds, the present invention further comprises a dynamic threshold adjustment controller. The dynamic threshold adjustment controller counts the number of times, Ri, that data level in the FIFO buffer reaches the soft threshold in a predetermined period of time, Tr to determine the counts per time value, Cr, where Cr=Ri/Tr. The soft threshold level is adjusted to allow for less memory storage room between the soft threshold and the hard threshold when the counts per time value, Cr, exceeds a first predetermined value. Conversely, the soft threshold level is adjusted to allow for more memory storage room between the soft threshold and the hard threshold when the counts per time value, Cr, falls below a second predetermined value.

In a second embodiment, used when there is no capability to determine whether another device sharing the system bus is requesting for the use of the bus when a device is actively transferring data across the bus, the invention comprises means for monitoring the state of the FIFO buffer by determining whether the data level crosses the first or second threshold and means for acquiring the system bus for transferring data. The amount of data to be transferred depends on whether the data level crosses a first or second threshold. Less data is transferred if the first threshold is crossed than if the second threshold is crossed. To determine whether a data transfer is complete, the amount of data transferred is monitored.

The earlier stated advantages are also satisfied by another aspect of the present invention which provides a method of dynamically controlling the data transfer of a FIFO buffer coupled to a system bus. The method comprises the steps of monitoring the state of the FIFO buffer, monitoring the state of the system bus, and casually or more aggressively acquiring the system bus, selectively, for transferring data depending on status of the FIFO buffer and status of the system bus.

An alternative method of controlling the data transfer of a FIFO buffer coupled to a system bus in which information related to whether another device is requesting use of the bus is not available comprises monitoring status of the FIFO buffer by determining whether the data level crosses the first or second threshold. The system bus is acquired for transferring data in an amount depending on whether the first or second threshold is crossed. Preferably, the amount of data associated with crossing the first threshold is less than the data associated with crossing the second threshold.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Although the present invention has applicability in peripheral hardware controllers such as disk controllers, SCSI controllers, parallel data port controllers, LAN controller, and WAN controllers, the best mode for practicing the invention is as part of a PCI-Ethernet network peripheral hardware controller. However, it is to be understood that the invention is applicable to any type of system bus and any type of communication network environment.

Figure 2:
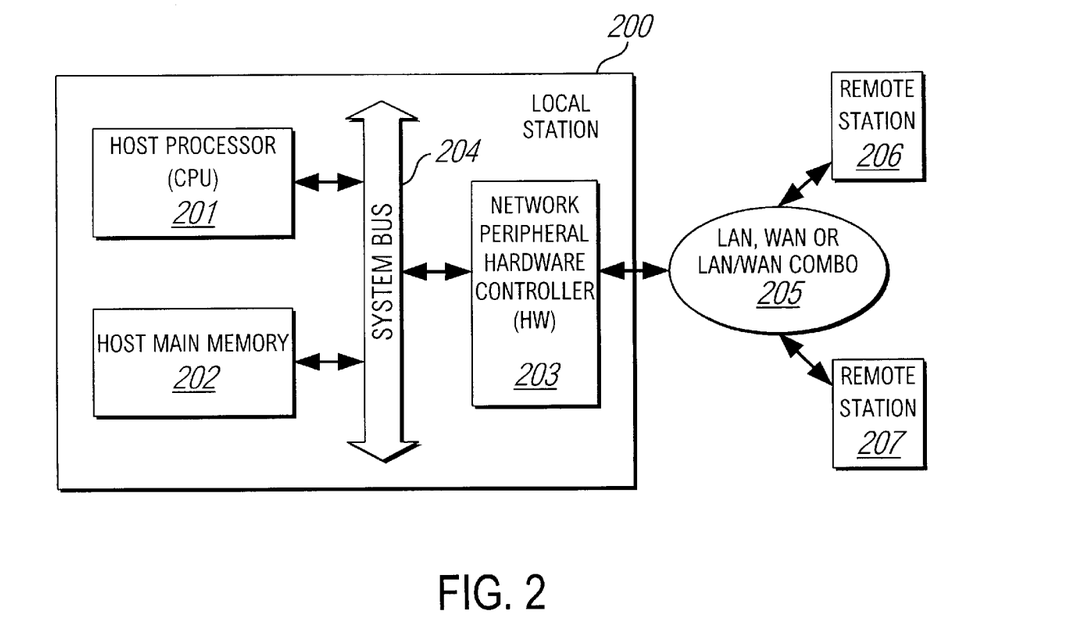
FIG. 2 illustrates a typical computer system that utilizes a network peripheral hardware controller in accord with the present invention.

FIG. 2 presents an overview of a typical computer system that utilizes a network peripheral hardware controller implemented in accordance with the invention. In FIG. 2, computer system 200 comprises host CPU 201, host memory 202, and network peripheral hardware controller 203. Network peripheral hardware controller 203 is coupled to host CPU 201 and host memory 202 through system bus 204. Network peripheral hardware controller 203 provides the interface between system bus 204 and LAN, WAN, or LAN/WAN combination 205 which in turn is coupled to remote stations 206 and 207.

Figure 3:
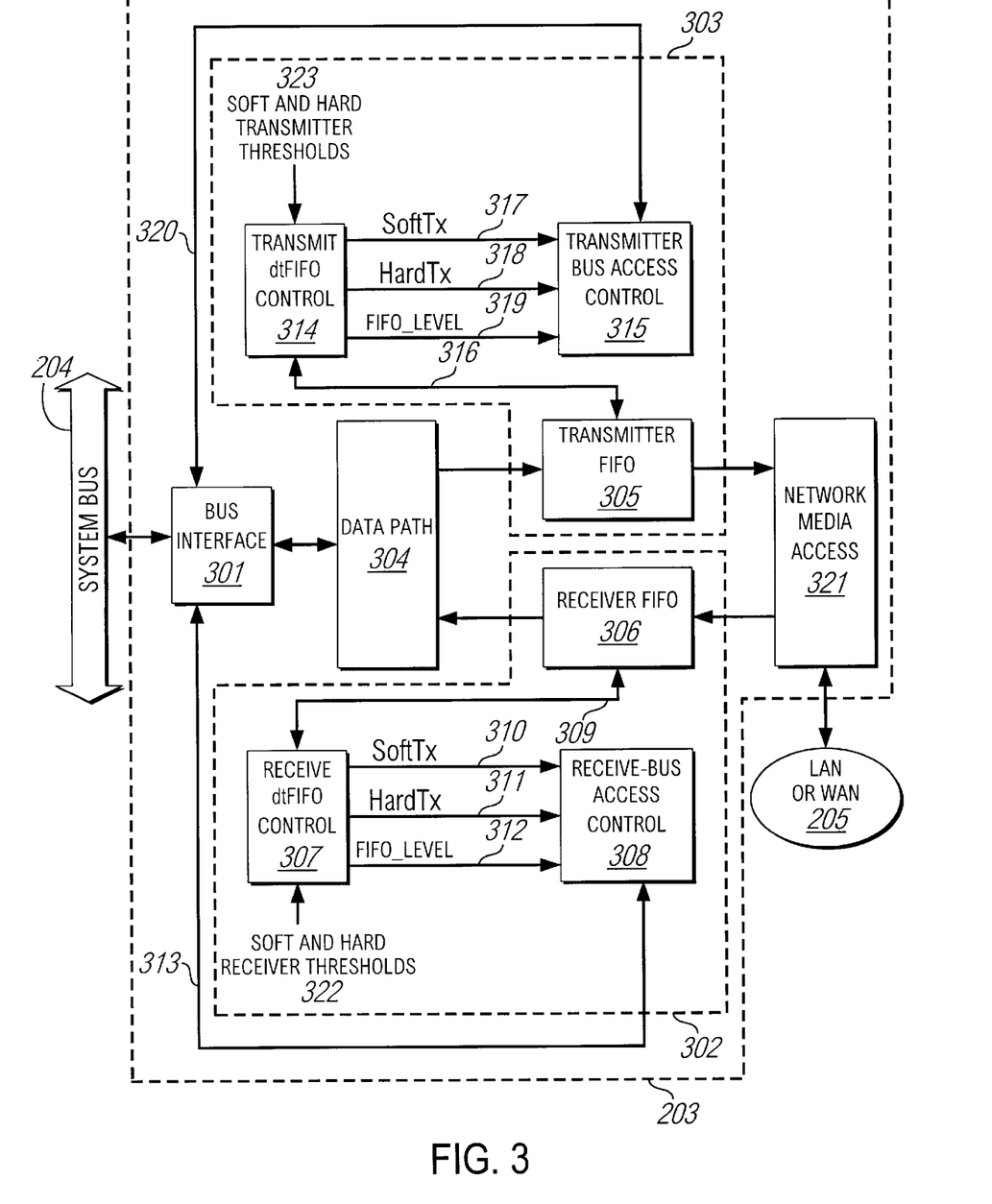
FIG. 3 is a block diagram of the network peripheral hardware controller shown in FIG. 2.

Reference is now made to FIG. 3 which provides a more detailed illustration of the network peripheral hardware controller 203. Receiver controller 302 comprises receiver FIFO 306, receiver FIFO controller 307, and receiver bus access controller 308. Receiver FIFO controller 307 maintains circular FIFO pointers and provides receiver FIFO 306 with information associated with the load and unload address locations via signal 309. FIFO controller 307 provides receiver bus access controller 308 with either control signals softRx 310 or hardRx 311 as well as status signal FIFO_level 312. Control signals softRx 310 and hardRx 311 are generated based on information related to the state of receiver FIFO 306 and soft and hard receiver threshold value signal 322 provided externally. Depending on the control signal and status signal received, receiver bus access controller 308 provides bus interface 301 with the appropriate control signal 313.

Similarly, transmitter controller 303 comprises transmitter FIFO 305, transmitter FIFO controller 314, and transmitter bus access controller 315. Transmitter FIFO controller 314 maintains circular FIFO pointers and provides transmitter FIFO 305 with information associated with the load and unload address locations via signal 316. Transmitter FIFO controller 314 provides transmitter bus access controller 315 with either control signals softTx 317 or hardTx 318 as well as status signal FIFO_level 319. Control signals softTx 317 and hardTx 318 are generated based on information related to the state of transmitter FIFO 305 and soft and hard transmitter threshold value signal 323 provided externally. Depending on the control signal and status signal received, transmitter bus access controller 308 provides bus interface 301 with the appropriate control signal 320.

Bus interface 301 is coupled to system bus 204 and controls the rate of data transfer to and from system bus 204 based on control signals 313 and 320 that are related to the state of receiver FIFO 306 and transmitter FIFO 305 and provided by receiver controller 302 and transmitter controller 303, respectively. Bus interface 301 is also coupled to data path 304 which, depending on the direction of data flow, channels data flow either from Bus interface 301 to transmitter FIFO 305 or from receiver FIFO 306 to Bus interface 301. Both transmitter FIFO 305 and receiver FIFO 306 are in turn coupled to network media access 321 which provides the interface between network peripheral hardware controller 203 and LAN, WAN, or LAN/WAN combo 205.

Figure 4A:
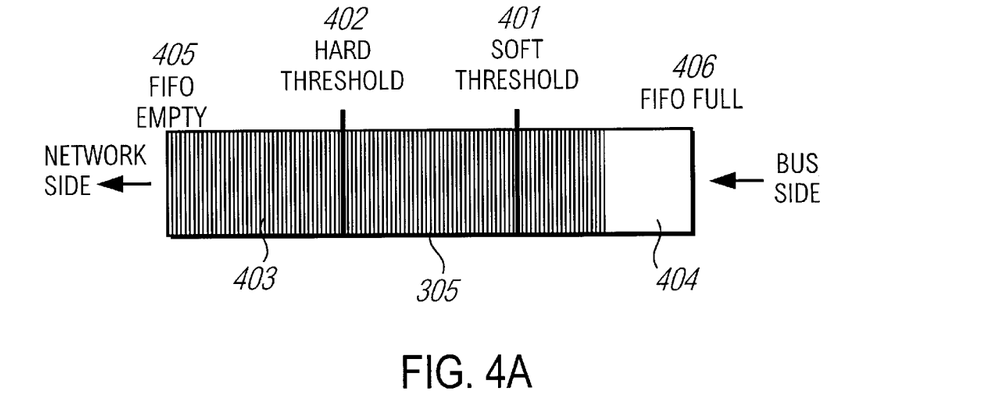
FIGS. 4a–4c are drawings for explaining the operations of a transmitter FIFO.
Figure 4B:
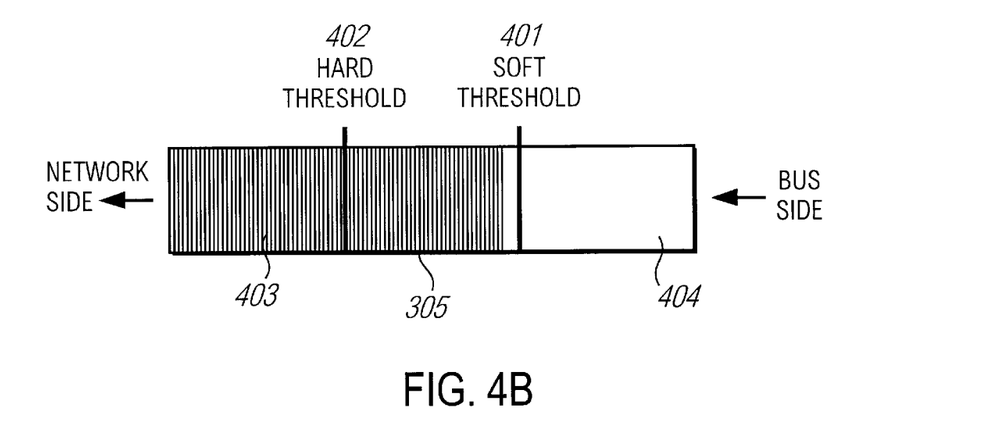
Figure 4C:
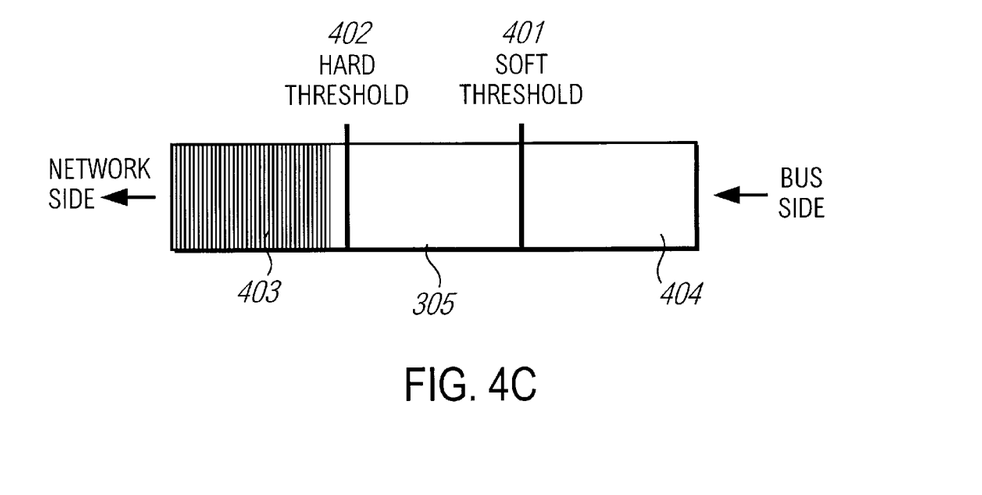

As shown in FIG. 3, transmitter FIFO 305 is used in the present invention to transfer data from system bus 204 to LAN, WAN, or LAN/WAN combo 205. On the other hand, receiver FIFO 306 is used to transfer data from LAN, WAN, or LAN/WAN combo 205 to system bus 204. Referring now to FIGS. 4a–4c, transmitter FIFO 305 is shown with the direction of data flow (from the bus side to the network side). As shown in FIGS. 4a–4c, transmitter FIFO 305 has a soft threshold level 401 and a hard threshold level 402. While the FIFO full space is depicted by filled area 403, the FIFO empty space is depicted by blank area 404. Moreover, transmitter FIFO 305 has a designated FIFO empty end 405 and a designated FIFO full end 406.

FIGS. 4a–4c taken together help explaining the operational sequence of transmitter FIFO 305 in an ideal scenario. Data is transferred from system bus 204 into transmitter FIFO 305 thereby filling transmitter FIFO 305 up with data. FIG. 4a shows transmitter FIFO 305 being filled with data past both hard threshold 402 and soft threshold 401. At this point, system bus 204 stops transferring data into transmitter FIFO 305 to prevent data overflow which may cause data loss. Data transfer into transmitter FIFO 305 may also stop when system bus 204 diverts its attention to other devices requiring its service. In the mean time, first-in data is being transferred out of transmitter FIFO 305 to LAN, WAN, or LAN/WAN combo 205. As shown by FIGS. 4a–4c, FIFO empty space 404 increases as data is being transferred out of transmitter FIFO 305.

When FIFO empty space 404 exceeds soft threshold 401 as shown in FIG. 4b, additional data should be transferred into transmitter FIFO 305 to maintain efficient use of transmitter FIFO 305. However, because the need for additional data is not very urgent as there are plenty of data remaining in transmitter FIFO 305 for transmission, for reasons of efficiency, system bus 204 should only be acquired to transfer additional data into transmitter FIFO 305 if system bus 204 has been idle. This casual bus mastership is relinquished when another device requests the use of system bus 204 and the current data block transfer is complete. On the other hand, when FIFO empty space 404 exceeds hard threshold 402 as shown in FIG. 4c, additional data is urgently needed for transmission by transmit FIFO 305 since the FIFO is almost empty. In this case, system bus 204 is aggressively and actively acquired for data transferring into transmitter FIFO 305. The aggressive control of system bus 204 is relinquished only after the entire intended data transfer is complete.

Figure 5A:
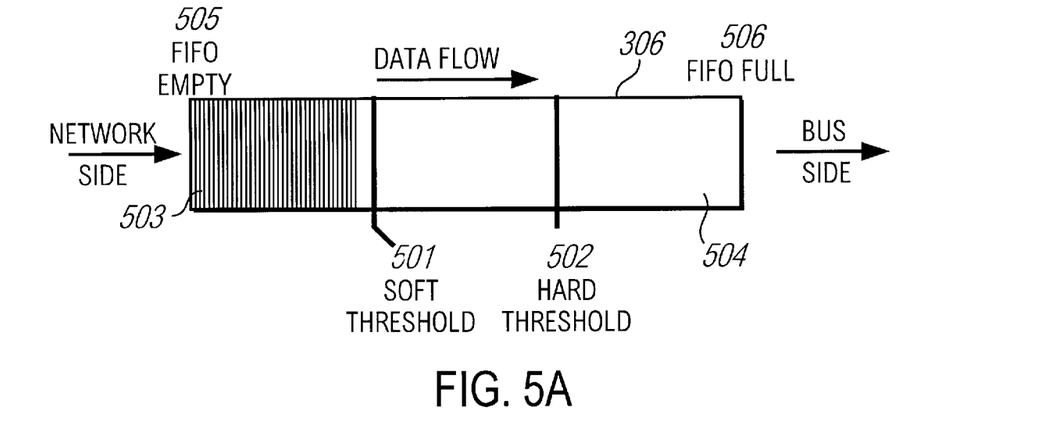
FIGS. 5a–5c are drawings for explaining the operations of a receiver FIFO.
Figure 5B:
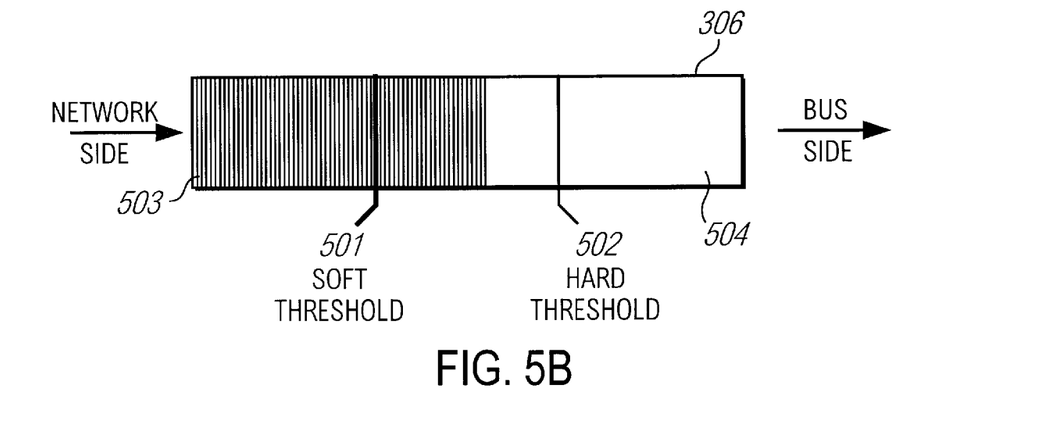
Figure 5C:
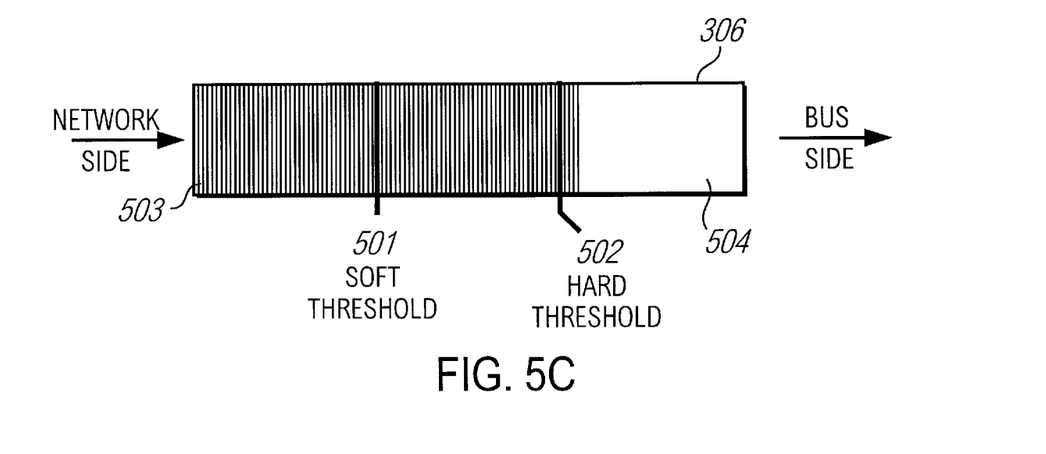

FIGS. 5a–5c show receiver FIFO 306 with the direction of data flow from the network side to the bus side. As shown in FIGS. 5a–5c, receiver FIFO 306 has a soft threshold level 501 and a hard threshold level 502. The FIFO full space is depicted by filled area 503 and the FIFO empty space is depicted by the blank area 504. Moreover, receiver FIFO 306 has a designated FIFO empty end 505 and a designated FIFO full end 506.

FIGS. 5a–5c taken together help explain the operational sequence of receiver FIFO 306 in an ideal scenario. Data is transferred from LAN, WAN, or LAN/WAN combo 205 into receiver FIFO 306 thereby filling receiver FIFO 306 up with data. FIG. 5b shows receiver FIFO 306 being filled with data past soft threshold 501. FIG. 5c shows receiver FIFO 306 filled with data past hard threshold 502. As shown by FIGS. 5a–5c, FIFO full space 503 increases as data is being transferred into receiver FIFO 306. To avoid overflow which may lead to data loss, data is transferred from receiver FIFO 306 to system bus 204. In designing against the unavailability of system bus at critical times, two threshold levels (hard and soft) are implemented in receiver FIFO 306.

When FIFO full space 503 exceeds soft threshold 501 as shown in FIG. 5b, data should begin to be transferred out of receiver FIFO 306. However, because the need for transferring data out of receiver FIFO 306 is not urgent as there are plenty of empty space remaining in receiver FIFO 306 for new data, system bus 204 should only be acquired to transfer data out of receiver FIFO 306 if system bus 204 has been idle. This casual bus mastership is relinquished when another device requests for the use of system bus 204 and the current data block transfer is complete. On the other hand, when FIFO full space 504 exceeds hard threshold 502 as shown in FIG. 5c, data needs to be urgently removed from receiver FIFO 306 since the FIFO is almost full. In this case, system bus 204 is more aggressively and actively acquired for removing data from receiver FIFO 306. The aggressive control of system bus 204 is relinquished only after the entire data transfer is complete.

Although the preferred embodiment implements two thresholds, hard and soft, it is clear that more than two thresholds can be implemented in monitoring the state/data level of the FIFO buffer to signify increasing levels of urgency. Moreover, while the preferred embodiment of the present invention uses the empty-space indication to trigger threshold crossings in transmitter FIFO 305 and the full-space indication to trigger threshold crossings in receiver FIFO 306, it is to be appreciated that the full-space indication could be used to trigger threshold crossings in transmitter FIFO 305 and similarly the empty-space indication could be used to trigger threshold crossings in receiver FIFO 306. Furthermore, it is to be appreciated that casual and more aggressive bus acquisitions can be characterized in other ways and still be within the scope and spirit of the present invention.

The following discussions of the FIFO controller and bus access controller apply equally to receiver FIFO controller 307 and receiver bus access controller 308 as well as to transmitter FIFO controller 314 and transmitter bus access controller 315, respectively. Generic descriptions, instead of separate descriptions for transmitter or receiver controller, are given for reasons of brevity and clarity.

Figure 6:
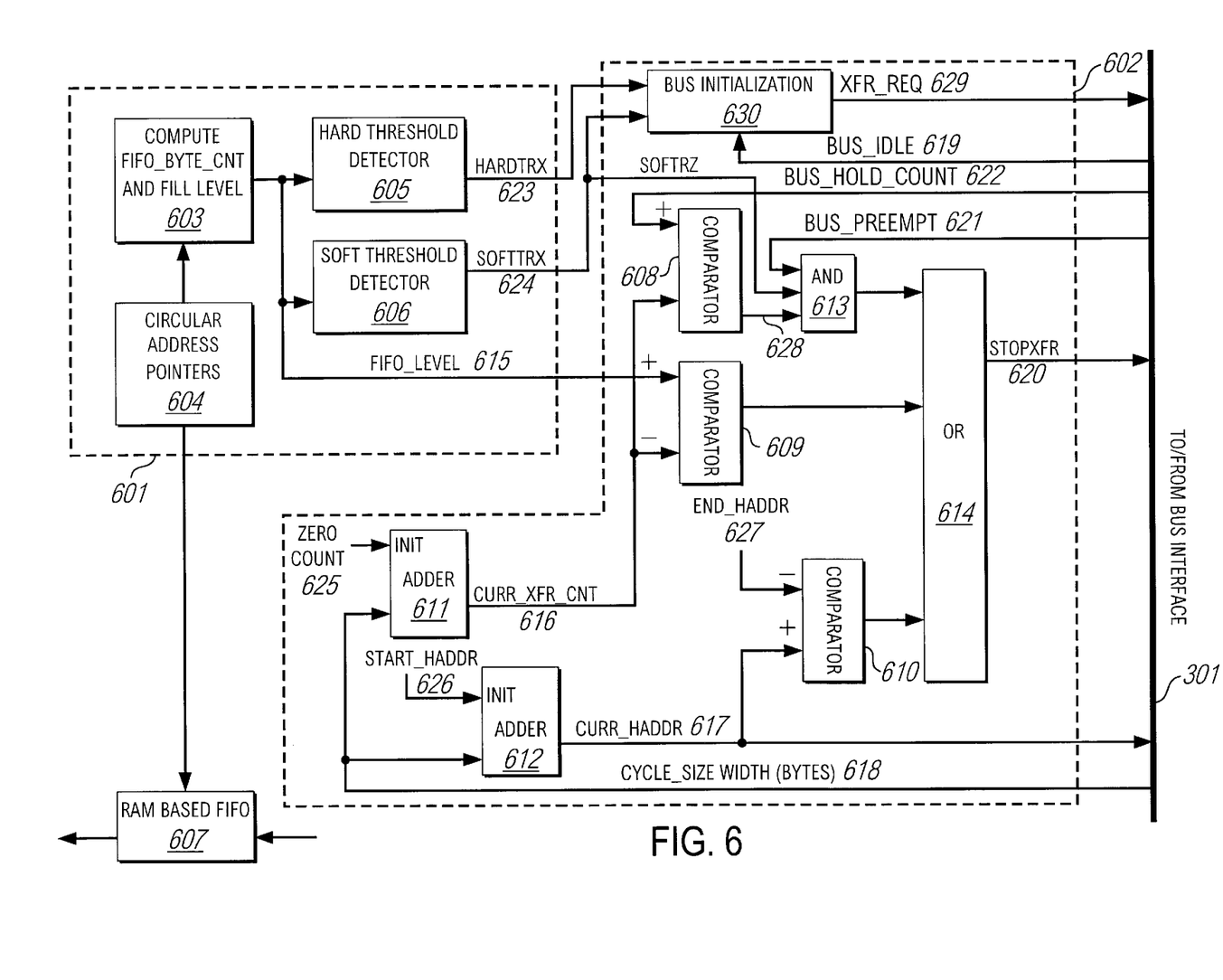
FIG. 6 is a block diagram of the FIFO controller and the bus access controller with bus activity monitor.

Reference is now made to FIG. 6 which is a block diagram illustrating in detail a generic FIFO controller 601 and a generic bus access controller 602 with bus activity detecting capability. FIFO controller 601 monitors the state of the FIFO to provide bus access controller 602 with information to determine whether to acquire the control of system bus 204. FIFO controller 601 comprises FIFO_level calculator 603, circular address pointers 604, hard threshold detector 605, and soft threshold detector 606. Circular address pointers 604 use two address pointers, one for loading and one for unloading, to keep track of the data transferred in and out of RAM based FIFO 607. Circular address pointers 604 provide FIFO_level calculator 603 with information related to the load and unload address pointers. This information coupled with the known capacity of FIFO 607 allow FIFO_level calculator 603 to determine the FIFO_level associated with the amount of data inside FIFO 607. Using well-known and widely used logic, FIFO_level can be expressed either in terms of the FIFO's full-space or empty-space. Because the mentioned logic is well understood, it is not further described.

FIFO_level 615 is provided as an input to hard threshold detector 605, soft threshold detector 606, and comparator 609. Hard threshold detector 605 compares FIFO_level 615 with its programmed value to determine whether FIFO_level 615 exceeds the hard threshold. When FIFO_level 615 exceeds the hard threshold, hard threshold detector 605 triggers hardTRx signal 623, which is provided as an input to bus initializer 630. Upon receiving hardTRx signal 623, bus initializer 630 sends control signal xfr_req 629 to bus interface 301 to aggressively acquire system bus 204 for data transfer. Upon receiving xfr_req signal 629, bus interface 301 goes through the normal protocol of the system bus to gain ownership of the bus and start a transfer. Similarly, soft threshold detector 606 compares FIFO_level 615 with its programmed value to determine whether FIFO_level 615 exceeds the soft threshold. If that is the case, soft threshold detector 606 triggers softTRx signal 624, which is provided as an input to bus initializer 637. SoftTRx signal 624 causes xfr_req signal 629 to go high to casually acquire system bus 204 for data transfer if bus_idle signal 619 indicates that system bus 204 is idle. Again, upon receiving xfr_req signal 629, bus interface 301 goes through the normal protocol of the system bus to gain ownership of the bus and start a transfer. As discussed earlier in the Background, a PCI bus provides bus preempt information indicating whether another device sharing the same bus is requiring the use of the bus. Bus access controller 602, shown in FIG. 6, takes advantages of the preempt information to relinquish the control of system bus 204 if it is in casual mode. Bus interface 301 provides bus access controller 602 with cycle-size signal 618 which indicates the amount of data transferred across system bus 204 on each cycle. For a PCI bus, the amount of data transferred per cycle is normally equal to the bus width (i.e., 4 bytes for 32 bit bus). However, if the data address is not an exact multiple of four, then less than four bytes will be transferred per cycle. Also, some other busses have dynamic "bus sizing" mechanisms through which targets can decide how many bytes to accept per transfer. At the start of a transfer, zero_count signal 625 is activated causing adder 611 to set curr_xfr_cnt signal 616 to zero. On each data transfer cycle that follows, adder 611 updates curr_xfr_cnt signal 616 by adding to its value the new value of the cycle_size signal 618. Hence, curr_xfr_cnt signal 616 represents the running total of the number of data bytes transferred up to now. Signal curr_xfr_cnt 616 is provided as inputs to comparator 608 and comparator 609.

Comparator 608 receives as its second input bus_hold_count signal 622 which is a pre-programmed constant designed to implement a hysteresis function of the soft threshold so that system bus 204 is not repeatedly acquired for small transfers. As more data continues to transfer across system bus 204, the value of curr_xfr_cnt signal 616 increases until it reaches the value of bus_hold_count 622. At this point, comparator 608 sends a high signal to AND gate 613 to indicate that control over system bus 204 can be relinquished if bus_preempt signal 621 indicates that another device is requesting use of the bus. AND gate 613 also receives as its other inputs: softTRx signal 624, which indicates that system bus 204 has been casually acquired, and bus_preempt signal 621, which indicates that another device sharing system bus 204 has requested for its service. As such, bus access controller 602 relinquishes the casual control of system bus 204 when three conditions are met: 1) system bus 204 reports a request by another device for its service; 2) the bus was casually acquired when the soft threshold was reached; and 3) the bus has been casually acquired for a predetermined time period. When these three conditions are met (i.e., when all three inputs of AND gate 613 are high), AND gate 613 generates a high signal to OR gate 614 which in turn generates signal stopXFR 620 to relinquish control of system bus 204.

In addition to signal curr_xfr_cnt 616, comparator 609 receives as its second input FIFO_level signal 615. Comparator 609 compares its inputs to check against overrun (i.e., data overflow) in the case of a receiver FIFO and underrun (i.e., FIFO is empty) in the case of a transmitter FIFO. When either of these conditions occurs, comparator 609 supplies a high signal to OR gate 614 which in turn generates stopXFR signal 620 to relinquish control of system bus 204.

Adder 612, which is similar to adder 611, is used to monitor the system memory addresses involved in the current transfer. Adder 612 receives as its inputs cycle_size signal 618 and start_haddr signal 626, the starting system memory address of the data block to be transferred. At the start of a transfer, adder 612 sets the value of curr_haddr signal 617 equal to the value of start_haddr signal 626. On each data transfer cycle that follows, adder 612 updates curr_haddr signal 617 by adding to its value the new value of cycle_size signal 618. Hence, curr_haddr signal 617 represents the current system memory address of data to be transferred. Curr_haddr signal 617 and end_haddr 627 are provided as inputs to comparator 610 which compares its two inputs to make sure that the controller neither reads data from memory addresses beyond its allocated limits nor writes data to memory addresses beyond its allocated limits. In other words, during a data transfer, data will only be transferred to or from locations in system memory with addresses in the range between the value of start_haddr signal 626 and end_haddr signal 627. When curr_haddr signal 617 is equal to or greater than end_haddr signal 627 indicating that the allocated memory addresses have been exceeded, comparator 610 generates a high signal to OR gate 614 which in turn generates signal stopXFR 620 to relinquish control of system bus 204.

As discussed in the Background, some system buses may not provide bus_preempt or bus_idle indication. In this case, the casual control of system bus 204 can be controlled in terms of either time or data quantity. That is when either the soft threshold or the hard threshold is crossed, the system bus can be controlled for a predetermined period of time or for transferring a predetermined amount of data. Although the embodiment shown in FIG. 7 undertakes the data quantity approach, it is to be appreciated that the time approach is within the scope and spirit of the present invention.

Figure 7:
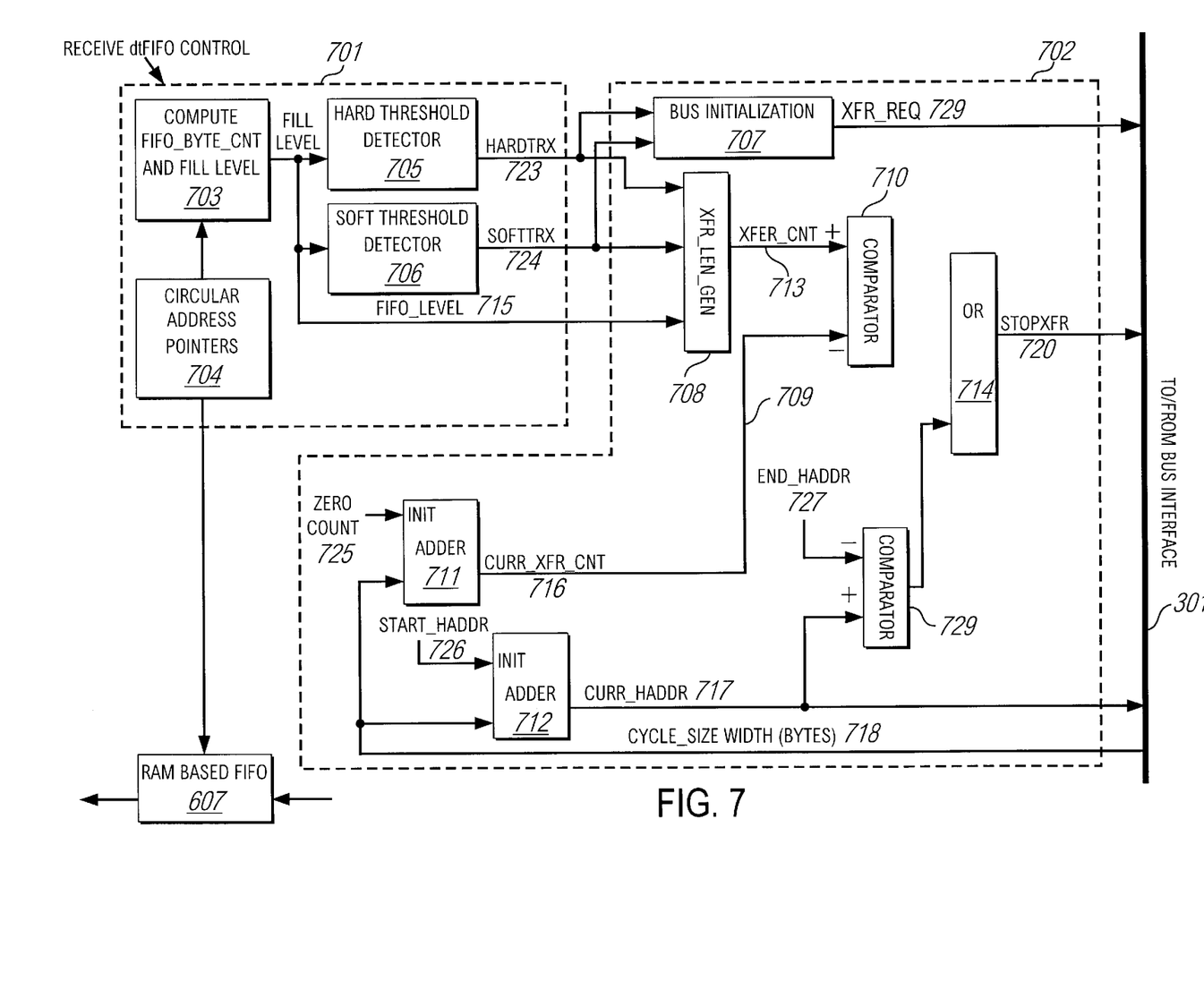
FIG. 7 is a block diagram of the FIFO controller and the bus access controller without bus activity monitor.

FIG. 7 presents a second embodiment of the invention by depicting in detail a generic FIFO controller 601 and a generic bus access controller 702 designed for operation on busses where bus_idle and bus_preempt indications are unavailable. Because FIFO controller 601 shown in FIG. 7 is identical to FIFO controller 601 shown in FIG. 6, no further description of this controller is provided. On the other hand, bus access controller 702 is different from bus access controller 602 and is described next.

When the FIFO's hard threshold is crossed, hard threshold detector 605 generates hardTRx signal 623 and provides it as an input to bus initializer 707. Bus initializer 707 then sends control signal xfr_req 729 to bus interface 301 to aggressively acquire control of system bus 204. Similarly, when the FIFO's soft threshold is crossed, soft threshold detector 606 generates softTRx signal 624 and provides it as an input to bus initializer 707. Bus initializer 707 then sends control signal xfr_req 729 to bus interface 301 to casually acquire control of system bus 204.

HardTRx signal 723, softTRx 724, and FIFO_level 715 are provided as inputs to xfr_len_gen 708 which in turn generates xfer_cnt signal 713. Xfer_cnt signal 713 represents a predetermined amount of data to be transferred in response to hardTRx signal 723 and softTRx signal 724. The value of xfer_cnt signal 713 varies depending on FIFO_fill$_{13}$ level 715 and on whether hardTRx signal 723 or softTRx signal 724 is received. In general, the value of xfr_cnt signal 713 generated as a result of hardTRx signal 723 is greater than that generated as a result of softTRx signal 724. Moreover, to incorporate a condition of hysteresis so that the bus controller is not thrashing on the bus (i.e., repeatedly acquiring the bus for small transfers), the value of xfr_cnt signal 713 generated with softTRx signal 724 must be such that, at the completion of data transfer, it causes the FIFO data level to be at an adequate distance away from the soft threshold. However, in generating the values for xfer_cnt signal 713, the FIFO level is considered to prevent overrun or underrun conditions. For this reason, FIFO_level signal 715 is also provided as an input to xfr_len_gen 708. Xfer_cnt signal 713 is provided as an input to comparator 709.

Bus interface 301 provides bus access controller 702 with cycle_size signal 718 which indicates the number of data bytes transferred across system bus 204 per cycle. Adder 711 receives as its inputs cycle_size signal 718 and zero_count signal 725. At the start of a transfer, adder 711 sets curr_xfr_cnt signal 716, which represents a running count of the amount of data transferred, to zero. On each subsequent cycle, adder 711 updates curr_xfr_cnt signal 716 by adding to its value the new value of cycle_size signal 718. Signal curr_xfr_cnt 716 is provided as input to comparator 709. Comparator 709 receives as its second input xfer_cnt signal 713. If xfer_cnt 713 is equal to or greater than curr_xfr_cnt signal 716 indicating that the requested data transfer is complete, comparator 709 generates a high signal to OR gate 714 which in turn generates stopXFR signal 720 to relinquish control of system bus 204.

Adder 712 is used to monitor the system memory addresses involved in the current data transfer. Adder 712 receives as its inputs cycle_size signal 718 and start_haddr signal 726 which represents the starting system memory address of the block of data to be transferred. At the start of a transfer, adder 712 sets the value of curr_haddr signal 717 to the value of start_haddr signal 726. On each data transfer cycle that follows, adder 712 updates curr_haddr signal 717 by adding to its value the new value of cycle_size signal 718. Thus, curr_haddr signal 717 represents the current system memory address of data to be transferred. Curr_haddr signal 717 and end_haddr signal 727 are provided as inputs to comparator 710 which compares its two inputs to make sure that the DMA controller neither reads data from memory addresses beyond its allocated range or write data to memory addresses beyond its allocated range. In other words, during a data transfer, data will only be transferred to or from system memory locations with addresses between the value of start_haddr 726 and end_haddr 727. When the value of curr_haddr signal 717 is equal to or greater than the value of end_haddr signal 727, indicating that the allocated memory addresses have been exceeded, comparator 710 sends a high signal to OR gate 714 which in turn generates stopXFR signal 720 to relinquish control of system bus 204. Because the level of bus activities on the CPU bus tends to fluctuate over time, either the soft or hard threshold could be designed to automatically adjust according to the level of bus activities to improve the efficiency of the system bus. More particularly, the thresholds should be adjusted so that the system bus is not interrupted unnecessarily. At the same time, the thresholds should be adjusted to minimize data loss, minimize bus latencies, and to minimize data transit delays through the FIFO buffer to system memory. This can be best understood by considering the effects caused by improperly set data thresholds. When the hard threshold is set too high (i.e., close to end of FIFO buffer), the likelihood of data loss is increased because the bus may not be able to transfer sufficient data before the FIFO level reaches the end of the FIFO buffer. When the hard threshold is set too low (i.e., far from end of FIFO buffer), aggressive control of the bus is acquired more frequently than necessary making bus unavailable for other devices. When the soft threshold is set too low (i.e., close to end of FIFO buffer), casual control of the bus is acquired more frequently than necessary causing unneeded bus interruptions. Finally, when the soft threshold is set too high (i.e., far from end of FIFO buffer), data transit delays through the FIFO buffer is increased.

In the present invention, casual control, which is triggered by the crossing of a soft threshold, is relinquished after a time period following a request by another device sharing the bus. On the other hand, because the need of the system bus is more urgent during aggressive control, aggressive control completely ignores bus requests by other devices and is relinquished only when the intended data transfer is complete. As such, the hard threshold is set to minimize the probability of data loss by providing adequate space between the hard threshold and the end of the FIFO buffer based on statistical average estimates of bus and peripheral data transfer rates. On the other hand, the soft threshold is adjusted dynamically to optimize bus utilization, bus latency, and data transit delays.

Although the following discussion on the dynamic threshold adjustment controller refers only to soft thresholds, it is to be appreciated that the discussion applies in general to both soft and hard thresholds. Further, it is to be appreciated that the dynamic threshold adjustment controller functions equally well with either receiver or transmitter FIFO controller.

Figure 8:
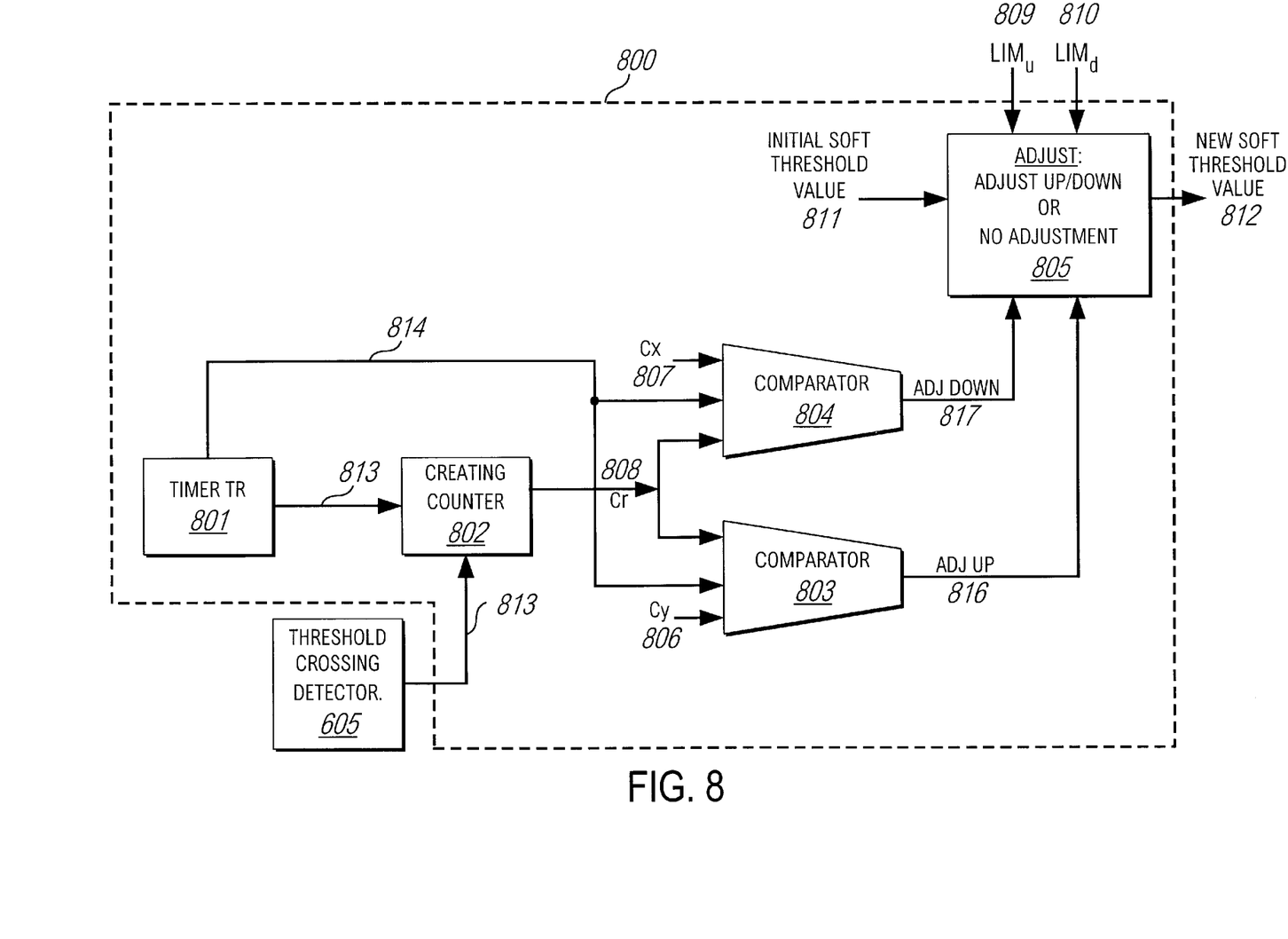
FIG. 8 is a block diagram of the dynamic threshold adjustment controller.

FIG. 8 is a block diagram of the dynamic threshold adjustment controller 800. Timer 801 keeps track of a predetermined time period Tr. Crossing counter 802 is used to count the number of times the soft threshold is crossed in time period Tr. At the start of each time period Tr, timer 801 provides clear signal 813 to crossing counter 802. Upon receiving clear signal 813, crossing counter resets its count. Subsequently, every time soft threshold detector 606 detects a crossing of the soft threshold, it generates count signal 815 and provides it as an input to crossing counter 802 which increments its count. Crossing counter 802 may count either the number of times that the soft threshold is crossed in either direction or in only one direction. It makes no difference as long as the host CPU considers the type in setting the limit values for dynamic adjustments.

Crossing counter 802 provides the current count 808 as its output to comparators 803 and 804. A predetermined limit count value Cx 807 is provided as a second input to comparator 804. Likewise, a predetermined limit count value Cy 806 is provided as a second input to comparator 803. At the end of each time period Tr, timer 801 provides compare signal 814 to both comparators 803 and 804. Upon receiving compare signal 814, comparator 803 compares current count value Cr 808 with limit count value Cy 806. When current count value Cr 808 exceeds count value Cy 806, comparator generates adj-up signal 816 as an input to threshold adjuster 805. Upon receiving adj-up signal 816, threshold adjuster 805, which has an initial soft threshold set by initial soft threshold value 811, adjusts the soft threshold upward to make less room between the hard threshold and the soft threshold. However, given its upper limit input LIMu 809, the soft threshold is not allowed to move beyond this limit.

Similarly, upon receiving compare signal 814, comparator 804 compares current count value Cr 808 with limit count value Cx 807. When current count value Cr 808 falls below count value Cx 807, comparator 804 generates adj-down signal 817 as an input to threshold adjuster 805. Upon receiving adj-down signal 817, threshold adjuster 805 adjusts the soft threshold downward to make more room between the hard threshold and the soft threshold. However, given its lower limit input LIMd 810, the soft threshold is not allowed to move beyond this limit.

Figure 9A:
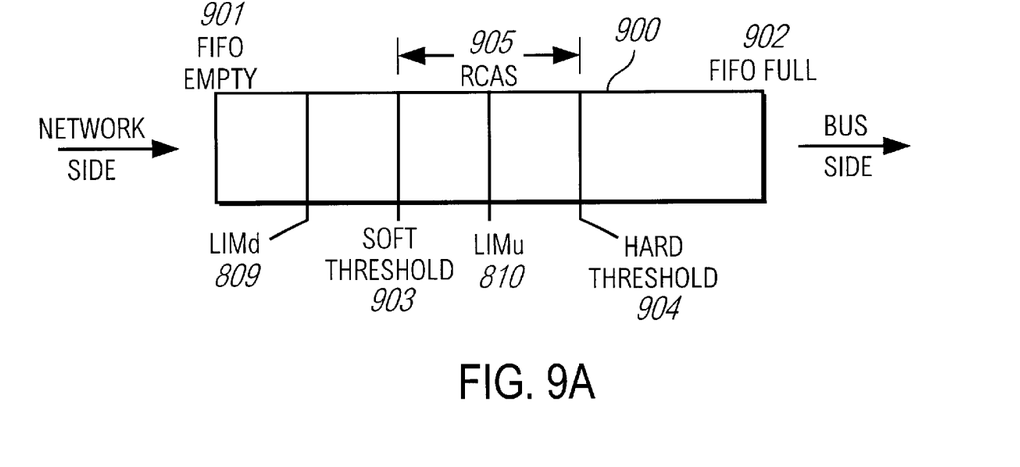
FIG. 9a–9c are drawings for explaining the adjusted soft threshold relative to its initial level as well as to its upper and lower limits.
Figure 9B:
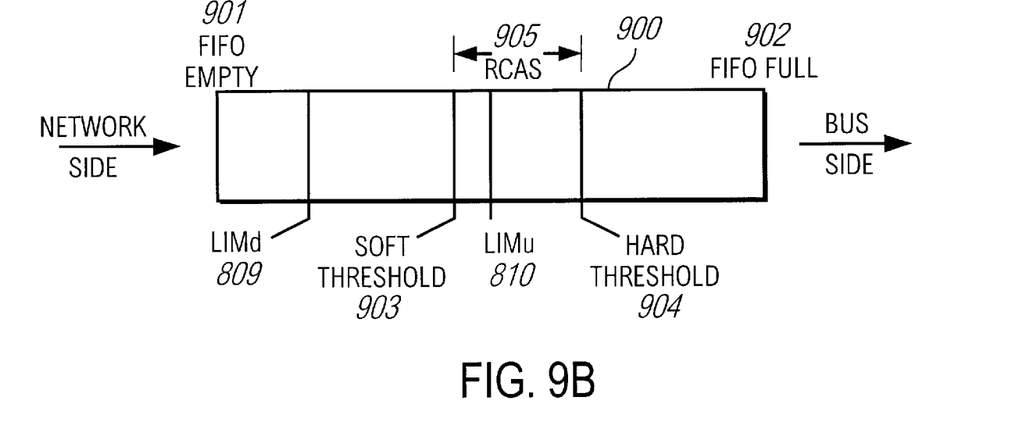
Figure 9C:
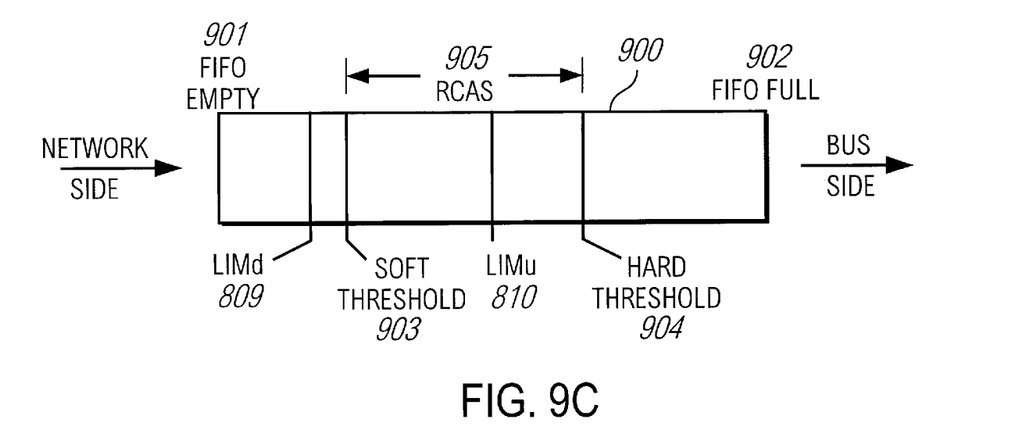

FIGS. 9a–9c are provided as visual aids to demonstrate the new adjusted soft threshold with respect to the initial soft threshold. FIG. 9a shows FIFO 900 with FIFO empty end 901 and FIFO full end 902. FIFO 900 has soft threshold 903 at its initial level, LIMu 810, hard threshold 904, and LIMd 809. For reference purposes, rcas 905 illustrates the distance between soft threshold 903 and hard threshold 904. FIG. 9b shows the upward adjustment of soft threshold 903 which does not go beyond LIMU 810. On the other hand FIG. 9c illustrates the downward adjustment of soft threshold 903 which does not go beyond LIMd 809.

Although the present invention has been described and illustrated in detail, it is clearly understood that the same is by way of illustration and example only and is not to be taken by way of limitation, the spirit and scope of the present being limited only by the terms of the appended claim.

We claim:

1. An apparatus for controlling data transfer by a first-in-first-out (FIFO) buffer coupled between a system bus and an external interface, comprising:

means coupled to sad FIFO buffer for monitoring a status of said FIFO buffer, wherein said FIFO buffer has multiple data thresholds, said FIFO buffer status monitoring means keeps track of amount of data in said FIFO buffer by determining whether a data level crosses said multiple data thresholds;

means coupled to said FIFO buffer monitoring means and said system bus for monitoring a status of said system bus, said system bus status monitoring means monitoring whether said system bus is idle, busy, or being requested by another device coupled to said system bus; and means coupled to said FIFO buffer monitoring means, said system bus status monitoring means, and said system bus for casually or more aggressively acquiring control of said system bus, selectively, for transferring data depending on said status of said FIFO buffer and said status of said system bus.

2. The apparatus of claim 1, wherein said multiple data thresholds comprise a first and a second data threshold, the apparatus further comprises a means coupled to said FIFO buffer monitoring mean for dynamically adjusting at least one of said first and second data thresholds depending on fluctuating amount activities on said system bus.

3. The apparatus of claim 2 wherein said acquiring means casually acquires the control of said system bus for transferring data only during idle periods of said bus when said amount of data in said FIFO reaches said first threshold.

4. The apparatus of claim 3 wherein said acquiring means keeps track of the amount of the data transferred for determining whether a predetermined amount data has been transferred.

5. The apparatus of claim 4 wherein said acquiring means relinquishes said casual control of said system bus for transferring data after casually controlling said system bus to transfer a predetermined amount of data and after determining from said system bus monitoring means that a device coupled to said system bus is requesting the use of said bus.

6. The apparatus of claim 2 wherein said acquiring means more aggressively acquires the control of said system bus for transferring data when said amount of data in said FIFO reaches said second threshold.

7. The apparatus of claim 2 further comprises a means to count the number of times, Ri, that data level in said FIFO buffer reaches said first threshold in a predetermined period of time, Tr to determine the counts per time value, Cr, where Cr=Ri/Tr.

8. The apparatus of claim 7 further comprises a means to compare the counts per time, Cr, with a first predetermined value.

9. The apparatus of claim 8 wherein said first threshold level is adjusted in a direction to allow for less money storage room between said first threshold and said second threshold when said counts per time value, Cr, exceeds said first predetermined value.

10. The apparatus of claim 9 further comprises a means to compare the counts per time, Cr, with a second predetermined value.

11. The apparatus of claim 10 wherein said first threshold level is adjusted in a direction to allow for more memory storage room between said first threshold and said second threshold when said counts per time value, Cr, falls below said second predetermined value.

12. The apparatus of claim 11 wherein said first threshold adjustment stays within a predetermined range.

13. An apparatus for controlling data transfer by a receiver first-in-first-out (FIFO) buffer coupled between a system bus and an external interface, comprising:

means coupled to said FIFO buffer for monitoring a status of said FIFO buffer, wherein said FIFO buffer having multiple data thresholds, said FIFO buffer monitoring means monitoring whether a data level crosses a first or a second threshold to keep track of data amount in said FIFO buffer;

means coupled to said FIFO buffer status monitoring means and said system bus for monitoring a status of said system bus, said system bus status monitoring means monitoring whether said system bus is idle, busy, or being requested by another device coupled to said system bus; and means responsive to said status of said FIFO buffer and said status of said data bus for casually or more aggressively acquiring control of said system bus, selectively, for transferring data received by said FIFO buffer from said external interface across said system bus.

14. The apparatus of claim 13, further comprises a means coupled to said FIFO buffer monitoring means for dynamically adjusting at least one of said first and second data thresholds depending on fluctuating amount of activities on said system bus.

15. The apparatus of claim 13 wherein said acquiring means casually acquires the control of said system bus for transferring data only during idle periods of said bus when said amount of data in said FIFO reaches said first threshold.

16. The apparatus of claim 15 wherein said acquiring means keeps track of the amount of data transferred for determining whether a predetermined amount of data has been transferred.

17. The apparatus of claim 16 wherein said acquiring means relinquishes casual control of said system bus for transferring data after casually controlling said system bus to transfer a predetermined amount of data and after determining from said system bus monitoring means that a device coupled to said system bus is requesting the use of said bus.

18. The apparatus of claim 17 wherein said acquiring means more aggressively acquires the control of said system bus for transferring data when said amount of data in said FIFO reaches said second threshold.

19. An apparatus for controlling data transfer by a transmitter first-in-first-out (FIFO) buffer coupled between a system bus and an external interface, comprising;

means coupled to said FIFO buffer for monitoring a status of said FIFO buffer, wherein said FIFO buffer having multiple data thresholds, said FIFO buffer monitoring means monitoring whether a data level crosses a first or a second threshold to keep track of data amount in said FIFO buffer;

means coupled to said FIFO buffer status monitoring means and said system bus for monitoring a status of said system bus, said system bus status monitoring means monitoring whether said system bus is idle, busy, or being requested by another device coupled to said system bus; and means responsive to said status of said FIFO buffer and said status of said data bus for casually or more aggressively acquiring control of said system bus, selectively, for transferring data received by said FIFO buffer from said external interface across said system bus.

20. The apparatus of claim 19, further comprises a means coupled to said FIFO buffer monitoring means for dynamically adjusting at least one of said first and second data thresholds depending on fluctuating amount of activities on said system bus.

21. The apparatus of claim 19 wherein said acquiring means casually acquires the control of said system bus for transferring data only during idle periods of said bus when said amount of data in said FIFO reaches said first threshold.

22. The apparatus of claim 21 wherein said acquiring means keeps track of the amount of data transferred for determining whether a predetermined amount of data has been transferred.

23. The apparatus of claim 22 wherein said acquiring means relinquishes casual control of said system bus for transferring data after casually controlling said system bus for transferring a predetermined amount of data and after determining from said system bus monitoring means that a device coupled to said system bus is requesting the use of said bus.

24. The apparatus of claim 19 wherein said acquiring means more aggressively acquires the control of said system bus for transferring data when said amount of data in said FIFO reaches said second threshold.

25. A method for controlling data transfer by a FIFO buffer coupled to a system bus, said method comprising:

monitoring an amount of data in said FIFO, wherein said FIFO buffer has multiple data thresholds and said FIFO buffer monitoring means keeps track of amount of data in said FIFO buffer monitoring by monitoring whether a data level crosses said multiple data thresholds;

monitoring activity of said system bus by monitoring whether said system bus is idle, busy, or being requested by another device coupled to said system bus; and acquiring a casual or more aggressive control of said system bus, selectively, for transferring data to and from said FIFO buffer depending on a status of said FIFO buffer and a status of said system bus.

26. The method of claim 25, further comprises the step of dynamically adjusting at least one of said multiple data thresholds depending on fluctuating amount of activities on said system bus.

27. An apparatus for controlling data transfer by a FIFO buffer coupled between a system bus and an external interface, comprising:

first means for monitoring quantity of data stored in said FIFO buffer;

second means for monitoring a status of said system bus by determining whether said system bus is idle, busy, or being requested by another device coupled to said system bus;

means for establishing first and second data thresholds associated with said FIFO buffer;

means for comparing data stored in said FIFO buffer to said first and second data thresholds;

means response to said first monitoring means, said second monitoring means, and said comparing means for casually or more aggressively acquiring the control of said system bus, selectively, for transferring data depending on the state of said FIFO buffer and the state of said system bus; and means for dynamically adjusting at least one of said first and second data thresholds depending on the fluctuating amount of activities on said bus.

28. The apparatus of claim 27 wherein said acquiring means casually acquires the control of said system bus for transferring data only during idle periods of said bus when said amount of data in said FIFO reaches said first threshold.

29. The apparatus of claim 28 wherein said acquiring means keeps track of the amount of the data transferred for determining whether a predetermined amount data has been transferred.

30. The apparatus of claim 29 wherein said acquiring means relinquishes said casual control of said system bus for transferring data after casually controlling said system bus to transfer a predetermined amount of data and after determining from said system bus monitoring means that a device coupled to said system bus is requesting the use of said bus.

31. The apparatus of claim 27 wherein said acquiring means more aggressively acquires the control of said system bus for transferring data when said amount of data in said FIFO reaches said second threshold.

32. The apparatus of claim 27 wherein said threshold adjusting means comprises a means to count the number of times, Ri, that data level in said FIFO buffer reaches said first data threshold in a predetermined period of time, Tr to determine the counts per time value, Cr, where Cr=Ri/Tr.

33. The apparatus of claim 32 further comprises a means to compare the counts per time, Cr, with a first predetermined value.

34. The apparatus of claim 33 wherein said first threshold level is adjusted in a direction to allow for less money storage room between said first threshold and said second threshold when said counts per time value, Cr, exceeds said first predetermined value.

35. The apparatus of claim 34 further comprises a means to compare the counts per time, Cr, with a second predetermined value.

36. The apparatus of claim 35 wherein said first threshold level is adjusted in a direction to allow for more memory storage room between said first threshold and said second threshold when said counts per time value, Cr, falls below said second predetermined value.

37. The apparatus of claim 36 wherein said first threshold adjustment stays within a predetermined range.

* * * * *